April 26, 1932.  C. G. STRANDLUND  1,855,459
AXLE CAP FOR PLOW WHEELS
Filed Feb. 8, 1928

INVENTOR.
Carl G. Strandlund,
BY Brown, Jackson, Boettcher & Dienner
ATTORNEYS.

Patented Apr. 26, 1932

1,855,459

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

AXLE CAP FOR PLOW WHEELS

Application filed February 8, 1928. Serial No. 252,697.

The present invention relates to axle caps for plow wheels. In disk plows and other types of wheeled plows it is customary to mount the plow frame or beam on the front furrow wheel in such manner that the frame can be raised and lowered with respect to the front furrow wheel. A typical construction for obtaining this adjustable relation is to mount the front furrow wheel on the laterally bent lower end of an axle standard, the vertical portion of which passes upwardly through a guide boss on the plow frame. The vertical adjustment of the plow frame is effected through link mechanism which has operative connection with the axle standard and with the plow frame in such manner as to be capable of causing the plow frame to slide upwardly and downwardly along the axle standard.

The present invention pertains to the means for establishing the operative connection between the link mechanism and the axle standard. Said means comprises a cap which is mounted on the upper end of the axle standard and to which cap the link mechanism is connected. The axle standard is rotatable in the cap to accommodate steering movement of the front furrow wheel. It is desirable that the cap be held against moving upwardly off the end of the axle standard. To this end a pin is carried by the axle standard to project into an internal annular groove formed in the axle cap. Assembly of the cap over the pin is provided for by forming a vertical slot in the under side of the cap leading upwardly into the annular groove, through which slot the pin is adapted to be passed. The slot is formed at a point in the annular groove substantially diametrically opposite to that part of the groove normally occupied by the pin after assembly of the parts. Thus the pin can swing through almost a complete revolution in the groove in the steering movement of the furrow wheel without coming into registry with the slot, so that a wide range of steering movement of the wheel is possible, and the accidental separation of the axle standard and cap is effectively prevented in any of the normal positions of the wheel.

The above described construction provides a simple and inexpensive means for connecting the depth adjusting link mechanism to the axle standard, and one which will permit a wide range of steering movement of the furrow wheel, and which can also be readily assembled and disassembled.

Referring to the accompanying drawings illustrating my invention:

Figure 1:
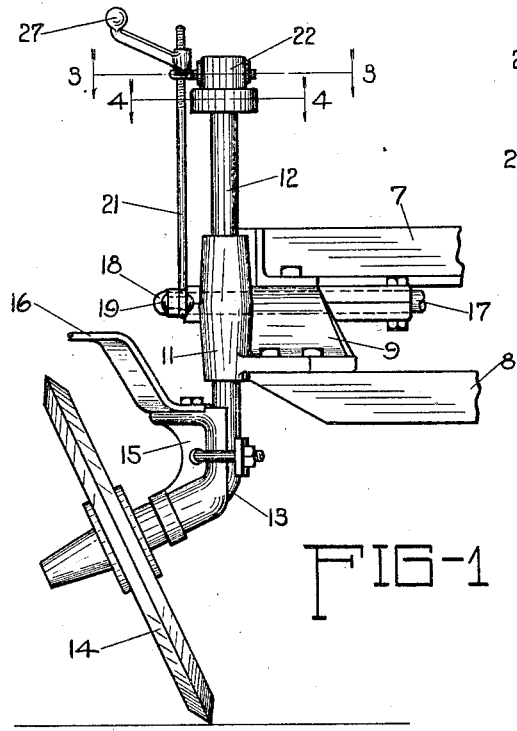
Fig. 1 is a fragmentary front elevational view of the front furrow wheel of a plow, illustrating my invention applied thereto.
Figure 3:
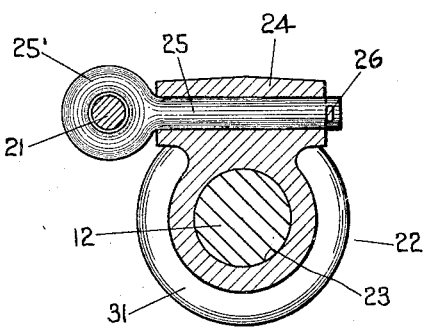
Fig. 3 is a horizontal sectional view through the upper portion of the axle cap, taken on the plane of the line 3—3 of Fig. 1.
Figure 4:
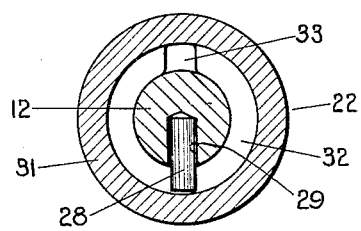
Fig. 4 is a similar sectional view taken on the plane of the line 4—4 of Fig. 1.
Figure 2:
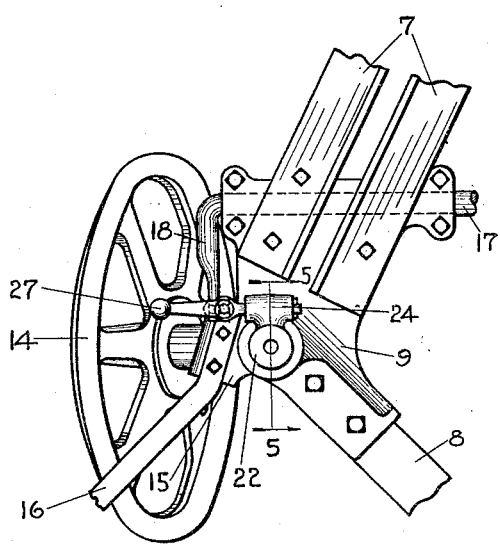
Fig. 2 is a plan view of the same.
Figure 5:
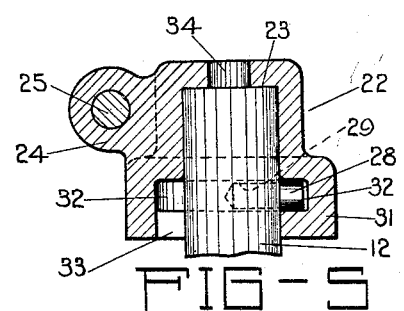
Fig. 5 is a vertical sectional view through the cap, taken on the plane of the line 5—5 of Fig. 2.

Figs. 1 and 2 illustrate the front portion of the plow frame, the two angle bars 7—7 representing the plow beam and the forwardly extending bar 8 representing the front portion of the frame. A heavy casting 9 joins these frame bars, and is formed with a vertical guide boss 11 in which is mounted the axle standard 12 of the front furrow wheel 14. The axle standard is formed with a laterally and downwardly inclined spindle portion 13 on which the furrow wheel is journaled. A bracket 15 is bolted to the angle portion of the axle standard and carries a steering arm 16 which is so connected to the draft bar of the plow as to cause steering movement of the wheel 14 with the steering movement of the tractor.

The plow frame, together with the plow elements mounted on the beam bars 7—7, are raised and lowered relative to the front furrow wheel 14 through rocking movement of a shaft 17 which has suitable bearing support in the casting 9. A crank arm 18 on one end of this shaft is pivotally connected at 19 to a link 21 which has operative connection at its upper end to the axle standard through the aforementioned axle cap, while the other end of the shaft is connected to any suitable lifting mechanism mounted on the frame.

The axle cap, designated 22 in its entirety, is formed with a cylindrical socket 23 in its upper end in which the end of the axle standard engages rotatably. A horizontal boss 24 extends from the rear side of the upper portion of the cap, and a connecting member 25 in the form of an eye-bolt is rotatably mounted in such boss, being held therein at one end by a cotter pin 26. The link 21 passes upwardly through the eye 25' of the member 25, the upper end of such link being threaded for receiving the threaded hub of a depth adjusting crank 27 which bears upon the upper side of the eye 25'. It will be apparent that by rotating the crank 27 a relatively fine vertical adjustment will be given the front end of the plow frame, independently of any vertical adjustment of the rear end of the plow frame. Rocking of the shaft 17 also causes a vertical lifting or lowering of the front end of the plow frame, such rocking movement, however, being usually so connected with the rear furrow wheel as to also cause vertical movement of the rear end of the plow frame, at least when the plows are being raised to transport position. This conventional plow structure is well known to those skilled in the art and does not constitute a part of the present invention.

The cap 22 is held against displacement from the upper end of the axle standard 12 by a pin 28 which is loosely seated in a socket 29 drilled in the side of the standard. The cap is formed with an enlarged portion 31 which extends over the pin, such enlarged portion being provided with an internal annular groove 32 in which the pin can swing freely in the rotative movement of the standard within the cap. At a point diametrically opposite to the normal position of the pin 28, a vertical slot 33 leads upwardly from the bottom of the cap into the groove 32. In the assembly of the parts, the cap is placed over the end of the axle standard, prior to the connection of the lifting link mechanism with the cap, and is rotated to bring the slot 33 into registry with the pin 28, whereupon the cap drops down over the pin to bring the latter into the groove 32. The cap is then rotated through approximately a half revolution to dispose the slot 33 oppositely to the pin 28, and the lifting link 21 is then connected to the cap. When the front furrow wheel is directed straight ahead the pin 28 thus occupies a position in the groove 32 substantially diametrically opposite to the slot 33. With this relation of the parts it will be evident that the axle standard can rotate to right or left through almost a half revolution without bringing the pin 28 into line with the slot 33. This is much in excess of the normal steering requirements of the front furrow wheel, and hence it will be seen that the axle cap imposes no limitations on the steering movement of the furrow wheel and at the same time the cap is effectively held against accidental displacement from the standard even at the extreme steering angles of the wheel. To remove the cap it is only necessary to disconnect the link 21 therefrom, and to then rotate the cap to bring the slot 33 into line with the pin 28, whereupon the cap can be lifted off the standard.

All the weight imposed on the front end of the plow frame is borne directly on the upper end of the standard 12 through the engagement of the end of the bearing socket 23 therewith. The groove 32 is made wider than the pin 28 so that none of the weight is borne by the pin. Lubricant may be supplied to the thrusting surfaces between the end of the standard 12 and the socket 23 through a hole 34 in the upper end of the cap.

For convenience, in the appended claims the lifting mechanism will be considered as consisting of the shaft 17 having the crank arm 18.

I claim:

1. In plow construction, the combination with a plow frame, a furrow wheel mounted on an axle standard having rotatable and slidable bearing support in said frame, and lifting mechanism mounted on the plow frame, of means for connecting said lifting mechanism with said axle standard including a cap rotatably mounted on the upper portion of said standard, a pin projecting from said standard, and an internal annular groove in said cap in which said pin engages and is free to move in the steering rotation of the standard in the cap, said groove having a slot leading downwardly therefrom through which said pin passes into and out of said groove whereby said cap may be lifted from the upper end of said standard independently of the removal of said pin from said standard by relatively rotating said pin and slot into registry.

2. In plow construction, the combination with a plow frame, a furrow wheel mounted on an axle standard having rotatable and slidable bearing support in said frame, and lifting mechanism mounted on the plow frame, of means for connecting said lifting mechanism with said axle standard including a cap rotatably mounted on the upper portion of said standard, a pin projecting from said standard, and an internal annular groove in said cap in which said pin engages and is free to move in the steering rotation of the standard in the cap, said groove having a slot leading downwardly therefrom through which said pin passes into said groove in the assembly of said cap on said axle standard, said slot being disposed substantially diametrically opposite to the position normally occupied by the pin in said groove when the furrow wheel is directed straight ahead whereby said standard can be revolved through approximately a half revolution in either direction in said cap before said pin comes into registry with said slot.

3. In plow construction, the combination with a plow frame, a furrow wheel mounted on an axle standard having rotatable and slidable bearing support in said frame, and lifting mechanism mounted on the plow frame, of means for connecting said lifting mechanism with said axle standard including a cap rotatably mounted on the upper portion of said standard, a pin projecting from said standard, an internal annular groove in said cap in which said pin engages and is free to swing in the steering rotation of said standard in said cap, said groove having an entry slot for said pin leading downwardly therefrom to the bottom of the cap and said slot disposed substantially diametrically opposite to the position normally occupied by the pin in said groove when the furrow wheel is directed straight ahead, the portion of said cap rotatably mounted on the upper portion of the standard forming a bearing socket whereby the weight imposed on said cap is transmitted thereby to said standard independently of said pin and groove.

4. In agricultural implement construction, the combination with an implement frame, a dirigible supporting wheel mounted on an axle standard having rotatable and slidable bearing support in said frame, and lifting mechanism mounted on said frame, of means for connecting said lifting mechanism to said axle standard comprising a cap rotatably supported on said standard, pin and groove means for preventing displacement of said cap from said standard, an eye pivotally supported on said cap on an axis substantially at right angles to the axis of said standard, a link extending from said lifting mechanism upwardly through said eye, the upper portion of said link being threaded, and a depth adjusting crank having an internally threaded hub portion screwing over said link and bearing against the upper side of said eye.

5. In agricultural implement construction, the combination with an implement frame, a dirigible supporting wheel mounted on an axle standard having rotatable and slidable bearing support in said frame, and lifting mechanism mounted on said frame, of means for connecting said lifting mechanism to said axle standard comprising a cap member rotatably supported on said standard and having an apertured member extending outwardly therefrom, a link connected to said lifting mechanism and passing upwardly through said apertured member, the upper portion of said link being threaded, and a depth adjusting member screwing over said link and bearing against said apertured member.

6. In agricultural implement construction, the combination with an implement frame, a dirigible supporting wheel mounted on an axle standard having rotatable and slidable bearing support in said frame, and lifting mechanism mounted on said frame, of means for connecting said lifting mechanism to said axle standard comprising a cap member rotatably supported on the top of said standard and having an apertured member extending laterally therefrom, a link connected to said lifting mechanism and passing upwardly through said apertured member, the upper portion of said link being threaded, and a depth adjusting member screwing over said link and bearing downwardly against said apertured member.

7. In agricultural implement construction, the combination with an implement frame, a dirigible supporting wheel mounted on an axle standard having rotatable and slidable bearing support in said frame, and lifting mechanism mounted on said frame, of means for connecting said lifting mechanism to said axle standard comprising a cap member rotatably supported on said standard and having an apertured member extending outwardly therefrom and freely rotatable in said collar member, a link connected to said lifting mechanism and passing upwardly through said apertured member, the upper portion of said link being threaded, and a depth adjusting member screwing over said link and bearing against said apertured member.

8. In agricultural implement construction, the combination with an implement frame, a dirigible supporting wheel mounted on an axle standard having rotatable and slidable bearing support in said frame, and lifting mechanism mounted on said frame, of means for connecting said lifting mechanism to said axle standard comprising a cap member rotatably supported on the top of said standard and having an apertured member extending laterally therefrom and being freely rotatably held in said cap member, a link connected to said lifting mechanism and passing upwardly through said apertured member, the upper portion of said link being threaded, and a depth adjusting member screwing over said link and bearing against said apertured member.

9. In agricultural implement construction, the combination with an implement frame, a dirigible supporting wheel mounted on an axle standard having rotatable and slidable bearing support in said frame, and lifting mechanism mounted on said frame, of means for connecting said lifting mechanism to said axle standard comprising a cap member rotatably supported on top of said standard and having an apertured member freely rotatably held in said cap member and extending laterally therefrom, a link connected to said lifting mechanism and passing freely upwardly through the aperture in said apertured member, the upper portion of said link being threaded, and an internally threaded depth adjusting member screwing over said link and bearing downwardly against said apertured member.

In witness whereof, I have hereunto set my hand and seal this 2nd day of February, 1928.

CARL G. STRANDLUND.